July 28, 1953 — H. W. DRYDEN — 2,646,930
INCUBATOR WITH AUTOMATIC TEMPERATURE AND HUMIDITY CONTROL
Filed Dec. 10, 1948 — 4 Sheets-Sheet 1

INVENTOR.
HORACE W. DRYDEN
BY
ATTORNEY

July 28, 1953    H. W. DRYDEN    2,646,930
INCUBATOR WITH AUTOMATIC TEMPERATURE
AND HUMIDITY CONTROL
Filed Dec. 10, 1948    4 Sheets-Sheet 2
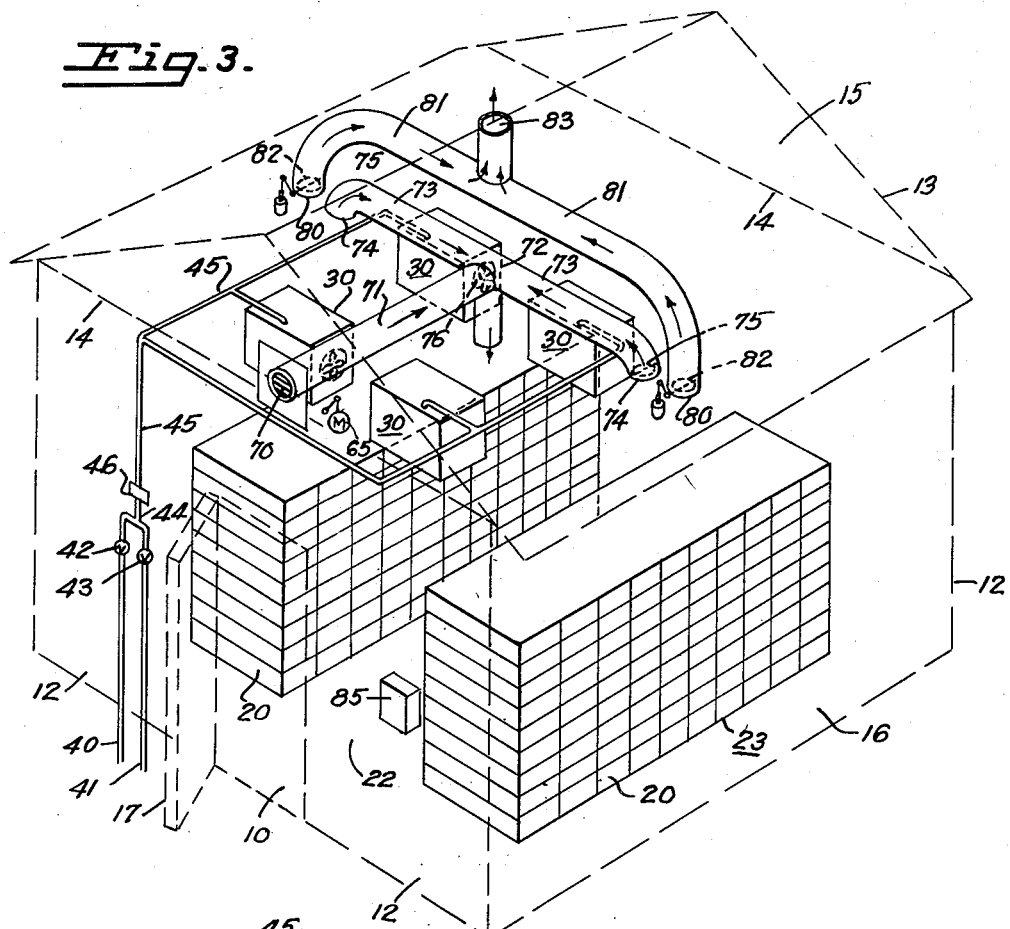
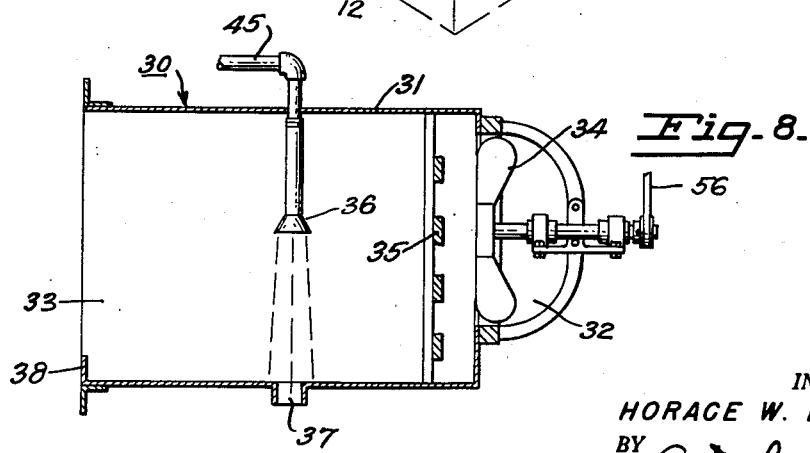
INVENTOR.
HORACE W. DRYDEN
BY
ATTORNEY

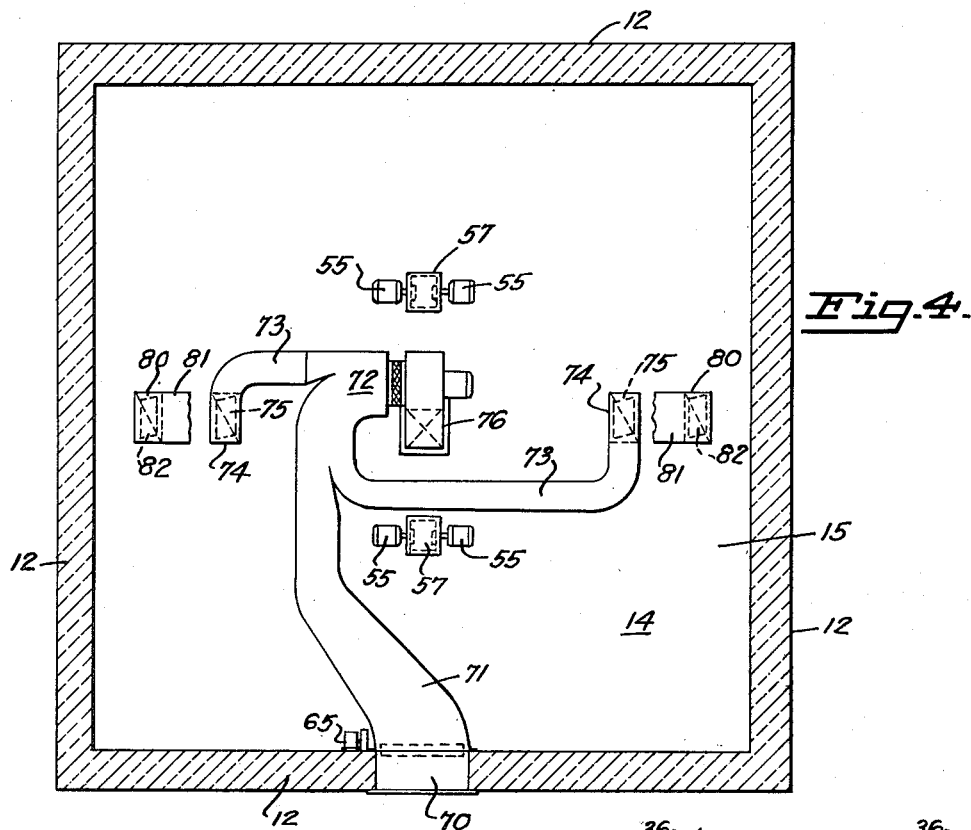
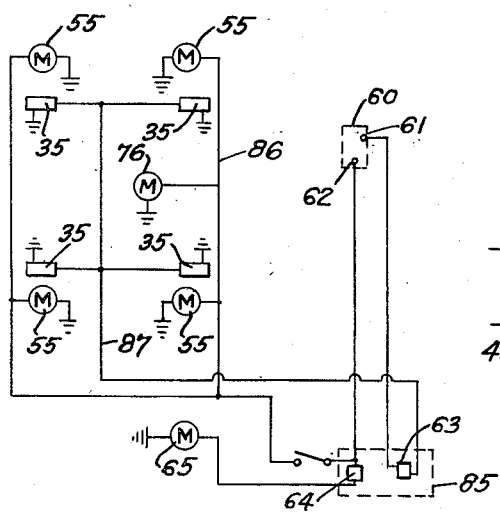

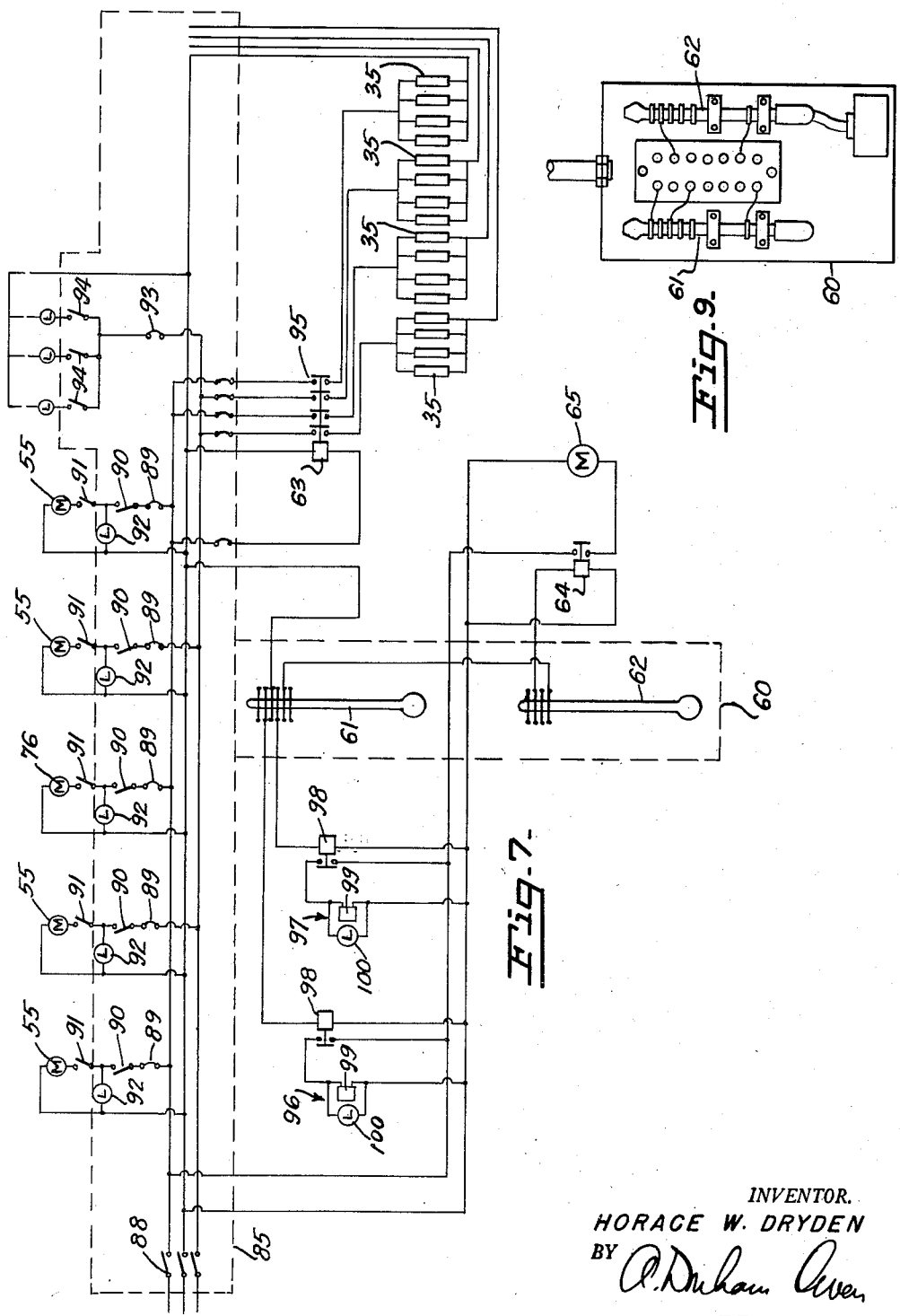

Patented July 28, 1953

2,646,930

UNITED STATES PATENT OFFICE 2,646,930

INCUBATOR WITH AUTOMATIC TEMPERATURE AND HUMIDITY CONTROL

Horace W. Dryden, Modesto, Calif.

Application December 10, 1948, Serial No. 64,554

5 Claims. (Cl. 236—2)

This invention relates to an improved incubator and to an improved method of incubation.

In the hatching of baby chicks, there are two general stages after the eggs are selected. First, is the setting stage during which time (usually 19 days) the eggs are kept under certain temperature and humidity conditions. Second, is the hatching stage when the baby chicks come out of the shells, during which time (usually 2 days) an entirely different set of temperature and humidity conditions should be maintained.

The present invention is an incubator which might be used for either setting or hatching, but it is especially well suited for the hatching stage. It solves many problems which have heretofore caused losses in hatching and discomfort to workers.

Although there are combination incubators on the market, many poultrymen prefer to use one incubator for the setting stage and a different incubator for the hatching stage. One reason for this is the different humidity requirements of eggs in the two stages. The usual practice is to start a new batch of eggs every few days so there will be a steady flow of baby chicks. At hatching time, approximately four days out of each week in most hatcheries, the atmosphere in the combination incubator must be maintained at a higher humidity than is good for the eggs in the earlier stages of incubation. If all the eggs are in the same incubator, the operator must then reduce the humidity the other three days of the week to a point lower than is desirable for hatching, in order to strike an average humidity and proper evaporation loss from the eggs for the 19 day setting period. This constant regulation or juggling of the humidity adds to the labor cost and prevents the use of the new and superior type of automatic humidity controls.

Another objection to combination incubators is that the ventilation requirements of eggs that are hatching are also different than those of eggs that have just been set.

An important factor to be considered in the construction of an incubator is good ventilation, the maintenance of adequate and continuous circulation of air, held at uniform temperature and uniform humidity throughout the hatching chamber. In an incubator the animal heat given off both by hatching eggs and by the hatched chicks is considerable, and there is rarely difficulty in maintaining the temperature at a high enough level. The difficulties more often are to keep the temperature down to the proper level and to keep it even. There is difficulty also in keeping each tray at the same temperature so that some eggs will not be too cool while other eggs are kept too hot. In some incubators the egg racks near the ceiling are warmer than those near the floor, with the result that the hatching conditions vary even inside the same incubator. For uniform hatching results, it is important to keep the humidity and temperature stable and uniform throughout the machine.

A related problem is that when the air circulating fans are stopped (e. g., by power failure), the animal heat raises the incubator temperature quickly and soon reaches a level fatal to the chicks. It takes only a few minutes of such a condition to lose an entire hatch. In one of the better and more popular hatchers, experience has shown that within twenty minutes after the fans have stopped about half the hatch of six to seven thousand chicks will have died, and the rest of the chicks are injured and unfit for sale. With the incubators heretofore in use these accidents occur in spite of extreme care and such precautions as providing a reliable power supply and checking all the machines at least every half hour day and night.

Other difficulties have arisen from the fact that the separate hatchers heretofore available have been large cabinets closed by a wide door. When the door was opened, all the hatching eggs were exposed to outside conditions. To remove the chicks each individual tray had to be pulled out and laid on a table or dolly. The hatching eggs and the chicks which had not dried were exposed to temperatures cooler than they could stand. Also a current of cold and unconditioned air entered the compartment every time the door was opened and closed. In a sixty-tray machine, to remove the trays one at a time, it was necessary to open and close the door sixty times. The bad effects of such frequent door openings has led most operators to remove all the trays at once after the last chicks are hatched. This latter procedure, however, has its bad aspects because all the chicks do not hatch at once and the first to hatch should be removed from the incubator as soon as they have dried and fluffed out. Prompt removal avoids contamination, and less dirt and down are produced. Moreover, in good hatches the trays have become very crowded unless those that hatch first are removed. If they are left in the tray, the hatched chicks have suffered from the excessively high tray temperatures, sometimes as high as 106° F., which built up from the animal heat.

Still another problem which present day hatchers have not solved heretofore has arisen from the down which emanates from the chicks in large quantities at hatching time. This down has been picked up in the air stream and its circulation has had harmful results. It has been demonstrated many times that pullorum organisms in particular are carried by this down. Pullorum disease first became a major problem about twenty-five years ago with the advent of forced draft incubators.

Chicken down in the air is also injurious to the health of human beings. Every time a tray has been pulled out from one of these separate hatchers, the ventilating fans inside usually have blown chicken down into the operator's face and have scattered it throughout the hatchery. The alternative has been to shut off the fan every time the door is opened. Yet this has been a dangerous practice and many hatches have been lost or seriously damaged because the operator forgot to turn the fan on again.

The problem of the comfort and health of the worker is complicated by other factors. The walk-in type of incubator has been very uncomfortable, since the worker has been subject to all the uncomfortable drafts of hot, humid air, carrying down and fuzz. In the best walk-in machine heretofore available, the operator encounters strong currents of air, usually at a temperature of 99° or even higher, blown from above directly on top of his head.

One further problem which has been common with all types of incubators is that the humidity affects the machinery, wearing out the motors quickly and in some cases causing unpredictable stoppages. The loss resulting when the fans stop has already been discussed.

One object of the present invention is to provide an improved incubator which solves the above problems.

Another object is to provide an improved incubator with a large margin of safety, and one capable of giving greater protection to the chicks from dangers such as result from shutdowns.

Another object of the invention is to provide an incubator which is more comfortable and healthier to work in.

A further object of the invention is to provide a novel substantially foolproof method of uniform incubation.

Another object of the invention is to provide means in an incubator for dissipating animal heat in such a manner that brief shutdowns will not ruin the eggs or chicks.

A still further object is to provide a walk-in type of incubator which is substantially unaffected in its operation by the opening of the door.

Another object of the invention is to provide an incubator having practically foolproof controls for heat and humidity.

Another object of the invention is to provide an incubator having air pressure chambers which aid in maintaining uniform circulation of the air.

Another object of the invention is to provide an incubator having means for eliminating the down from the air circulation system.

A further object is to provide an incubator in which the machinery is safeguarded from high humidity and temperature conditions.

Still another object is to provide an incubator having a novel system of humidification and humidity regulation.

Other objects and advantages of the invention will appear from the following description. A preferred form is described in accordance with U. S. Revised Statutes section 4888, but it is not intended thereby to limit narrowly the invention other than as required by the appended claims.

In the drawings:

Fig. 3 is a simplified isometric diagram of the incubator;

Fig. 4 is a plan view of the attic showing the air circulation system and the motors;

Fig. 5 is a diagram of the spray nozzle piping;

Fig. 6 is a plan view of the principal electrical wiring circuits;

Fig. 7 is a circuit diagram of the incubator;

Fig. 8 is a view in elevation and partly in section through one of the air-circulating fans; and Fig. 9 is a view in elevation of the thermostat box which controls the temperature and humidity inside the incubator.

Figure 1:
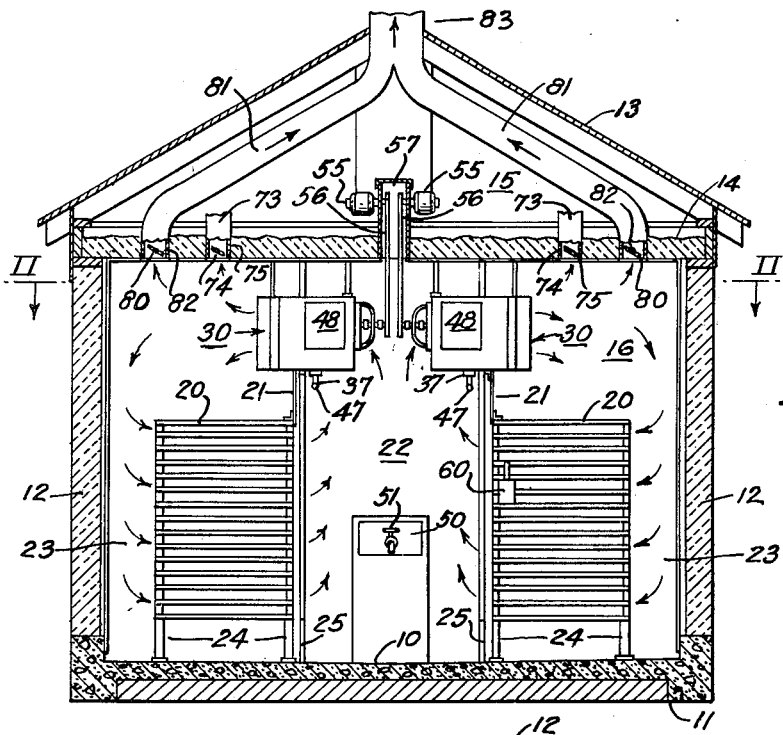
Fig. 1 is a view in elevation and partly in section of an incubator embodying the principles of the invention.

As stated at the outset, the present device is especially suited to the hatching stage, where the trays of eggs are in another incubator device during the setting stage and are not brought into the present device until the chicks are about ready to hatch. The hatching phase is a far more critical and delicate operation than the setting stage and, therefore, the cost of the present device is justified best for the hatching operation.

My improved method of incubation comprises placing the eggs in racks which occupy a relatively small amount of the total space in the room and form part of a partition separating the room into compartments. Then air is put under pressure on one side of the racks which causes the air to pass horizontally through the racks from the higher pressure compartment to the lower pressure compartment. Fresh air is added on the lower pressure side, and stale air is exhausted from the higher pressure side.

This method of having a large volume of air under pressure holds the temperature substantially uniform on the eggs in the racks and the large volume of air also increases the safety of the system, should a breakdown occur.

An apparatus for carrying out my method comprises an insulated room separated by an insulated ceiling into an incubator compartment below and an attic compartment above the ceiling. In the incubator compartment itself, the egg racks are spaced well away from the walls and ceiling, to provide an abundance of air space around them. Partitions divide the incubator room into a pressure chamber or compartment behind the egg racks and a service chamber or compartment in front of the racks.

Powerful blower units (whose motors are in the attic where they are protected from the humid incubator atmosphere) take air from the service chamber and blow it into the pressure chamber. At the same time a humidifier adds water to the air, and the down is removed from the wet air. Air then passes horizontally through the egg racks from the pressure chamber into the service chamber. A fresh air inlet is provided which blows air down from the attic into the service chamber and keeps it cooler than the other sections of the room. Stale air outlets are provided from the pressure chamber, and a recirculating system is provided in the attic which mixes some of the already heated air with the fresh air. The temperature and humidity are automatically controlled.

In the embodiment shown in the drawings, the improved incubator is a complete building, although it may be located inside another building. The incubator building comprises a floor 10 placed on a foundation 11, insulated walls 12, and an insulated sloping roof 13. Below the roof line an insulated ceiling 14 divides the interior of the building into an attic 15 above the ceiling 14, and an incubator room 16 below the ceiling. The room 16 may be entered through an insulated door 17, provided in one of the walls 12. Entrance to the attic 15 may be by a trap door or a high outside door, neither of which is shown.

The room 16 may be divided (as in Figs. 1, 2 and 3) by two rows of racks 20 and partition sections 21 into one central service chamber 22 (into which the door 17 opens) and pressure chambers 23 behind the racks. There may be more or fewer rows of racks and pressure chambers, but this arrangement illustrates the principle.

Preferably the racks 20, in which the egg trays are placed, are supported above the floor 10 on standards 24. Adjustable baffle plates 25 may be located below the racks 20 so that air may be prevented from passing below the racks or may be permitted to pass in various amounts, according to the position of the baffle plates 25.

The racks 20 are spaced away from the walls 12, so that a man may enter the pressure chambers 23 through the doors 26 in the partitions 21 to clean behind the racks. This spacing of the racks means that the pressure chambers 23 will be large and therefore able to maintain the air circulation through the incubator at an even pressure level. Preferably, there are also several feet of space between the tops of the racks 20 and the ceiling 14. In one embodiment which has given very satisfactory results, the ceiling 14 is five feet above the top of the egg racks 20, the service passage 22 is seven feet wide, and the egg racks 20 are spaced about three feet from the side walls and about 18" from the front and rear walls. The racks 20 occupy about one-third of the space inside the room 16, and the large air space around them provides an ample margin of air to take up the animal heat in case of a shutdown.

In the partition 21 above the racks 20 are several air circulating, heating and humidifying units 30. The drawings show four of these units 30, and Fig. 8 shows one of them in detail. The housing 31 is normally kept closed except for an intake opening 32 on the service chamber side and a larger outlet opening 33 on the pressure chamber side. A fan 34 is located adjacent the intake opening 32 so as to draw air from the service chamber 22 and direct it out to the pressure chamber 23 through the outlet opening 33.

Adjacent the fan 34 is a heater 35, which may be an electric strip heater or other suitable heating device. Beyond the heater 35 is a humidifying and down-controlling apparatus. Preferably this comprises a spray nozzle 36, suspended at a suitable height from the top of the housing 31. The housing 31 is provided with a drain opening 37 through its bottom plate and a rim 38 at the bottom of the outlet opening 33, to prevent the overflow of water.

Thus the air drawn in from the service chamber 22 through the intake 32 by the fan 34, passes first through the heater 35 and then through the humidifier and the down eliminator.

The water for the spray 36 is supplied through a hot water pipe 40 and a cold water pipe 41, whose valves 42 and 43 are outside the incubator. (See Fig. 3 and Fig. 5). The two streams of water are joined at a T-fitting 44 into a pipe 45 which supplies the sprays 36. Adjacent the T-fitting 44 is a thermometer 46 which indicates the temperature of the combined streams.

The absorption of water into the air as it passes beneath the spray nozzle 36 is determined by: (1) the temperature of the air, (2) the temperature of the water, (3) by the flow of air, and (4) by the flow of water. Preferably the flow rates of both water and air are kept constant, and the humidity is varied by varying the temperature of each. A rough approximation is obtained by adjusting the temperature of the water, and then the fine adjustment is obtained by varying the temperature of the air in a manner explained later on in this specification. To give this rough adjustment the valves 42 and 43 are preferably set to give a constant flow of water through the pipe 45, and the proportions of hot and cold water are varied to give the desired water temperature.

Water which is not evaporated by the air current is drained off through the opening 37 into a drain pipe 47 and thence is carried to a sewer.

The spray not only humidifies the air, it also washes it free from chicken down. After each hatch the substantial accumulation of down is removed from the units 30, by opening the doors 48 (see Figs. 1 and 2) and the inside of the unit is thoroughly washed out.

Other means of humidification and down control may be used. For example, a wick system or a cascade system may be used.

High humidity is desirable inside the incubator for the hatching stage and it is also desirable to be able to wash down the incubator and its parts with a hose. A sink 50 and a hose faucet 51 may be provided in the incubator room. In any event all the exposed parts are preferably non-corrodible, non-swelling material. No wood is used in any part which may be affected. The walls, floor, and ceiling may be tiled; the racks, door, fan housing, fan, and egg trays may be stainless steel or aluminum, and the partitions 21 may be made of glass.

Preferably the motors 55 for the fans 34 are safeguarded from this high humidity and from the washing water by being located in the attic 15. Belt drives 56, requiring only small openings 57 through the ceiling 14, are used to transmit the power from the motors 55 to the fans 34. By thus substantially isolating the motors 55 from the humid atmosphere in the room 16, their life and reliability are increased many fold.

The blower units 30 direct a strong stream of humid air from the service chamber 22 into the chamber 23 and build up substantial pressure inside the chamber 23. Then the air flows back into the chamber 22 in horizontal paths through the racks 20, maintaining the proper temperature either by heat supplied by the heater 35 or by animal heat given off by the hatching chicks.

Figure 2:
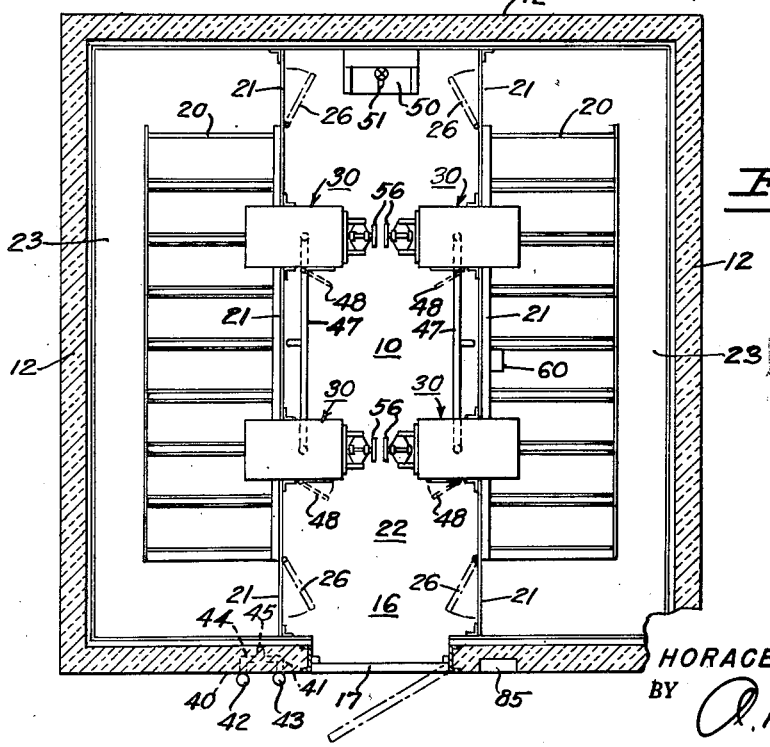
Fig. 2 is a plan view partly in section taken along the line II—II in Fig. 1.

Two types of automatic regulation are maintained over the temperature and humidity inside the incubator room 16, and these are both controlled from a control box 60 (see Fig. 1 for location and Fig. 9 for details) which is preferably located in the upper portion of one egg tray rack 20 at about the center of the room and adjacent the service chamber 22 (see Fig. 1). Inside the box 60 are two fixed-type mercury thermostats, a dry-bulb thermostat 61 and a wet-bulb thermostat 62.

The dry-bulb thermostat 61 controls the heaters 35 in the units 30, through a suitable electric circuit, to be described later in detail. Preferably it is regulated for a one-half degree range between 96.5° F. and 97° F. At the lower end of the range it actuates a relay 63 to turn on the heater 35; at the upper end of the range it actuates the relay 63 to turn the heater off.

The wet bulb thermostat 62 is used to control the air circulating system. (See Figs. 1, 3 and 4.) The thermometer 62 is preferably set for a one-half degree range between 87.0° F. and 87.5° F. When the temperature reaches the upper range, an electrical contact is closed which operates a relay 64. The relay 64 then operates a motor 65 to open the louvers in a register 70 located in the attic wall. At the lower end of the range, contact is broken and the register 70 is closed. The fine regulation of the humidity is thus obtained by admitting or shutting out fresh air and by heating or not heating the air passing through the units 30.

From the register 70 the fresh air passes through a duct 71 in the attic 15 into a manifold 72. At the manifold 72 it is joined by recirculation ducts 73 which lead out from the pressure chambers 23 through registers 74. The amount of air which is recirculated is preferably controlled manually by dampers 75 in the registers 74. A fan 76 in the lower part of the manifold 72 then blows this cooler mixture of fresh and recirculated air down into the service chamber 22. Some of it goes directly to the units 30; the rest goes there indirectly, after first cooling the chamber 22. By this means the chamber 22 is kept at about 95°, while the pressure chamber 23 is maintained at about 97° and the air passing through the racks 20 at about 100°.

Not all the air is recirculated. Stale air is also exhausted by gravity from the pressure chamber 23 through registers 80 into outlet ducts 81. Manually controlled dampers 82 regulate this flow. The outlet ducts 81 join at a chimney vent 83 which extends through the roof 13 and permits the stale air to flow out into the atmosphere.

A simplified version of the principal electrical circuits is shown in Fig. 6, and the complete electrical circuit is shown in Fig. 7. All of the controls are preferably centralized in a single box 85 which is shown outside the incubator just to the right of the door 17.

A galvanized steel conduit 86 may house the individual wires which control the motors 55 and the fan 76 (see Fig. 6). Another such conduit 87 carries the individual wires for the four heaters 35. Both conduits 86 and 87 terminate in the box 85, where there is a master switch 88 for both conduits 86 and 87 and there are also individual controls and instruments for each item.

For each motor 55 and 76 there may be an individual circuit breaker 89, switch 90 in the box 85 and a toggle switch 91 at the motor itself. For each motor there is also an individual pilot light 92 in the box 85. In addition there is another set of individual controls, including a circuit breaker 93 and switches 94 for controlling the lighting systems for the room 16 and the attic 15.

As before stated, the dry bulb thermometer 61 controls the heaters 35 through a relay 63. The relay 63 may turn the heaters off and on through a magnetic contactor 95. The wet bulb thermometer 62 controls the register 70 through a relay 64 and motor 65.

Alarm systems for both high and low temperatures supplement this automatic mechanism and give warning to the guard in case of a failure or of the necessity for a readjustment required by a drastic change in outside temperature. The high temperature alarm 96 and low temperature alarm 97 both include relays 98 which actuate buzzers 99 and warning lights 100.

For operation, the door 17 is normally closed, but the room 16 is so large and the circulation pattern so constant over its inside path that the door may be left open for relatively long periods of time without harm. The units 30 are the only operating parts inside the room. Air from the service chamber 22, including some fresh air from the duct 71, is drawn through the units 30, where it is humidified by the water spray, and then is blown into the pressure chambers 23. Although some of the air passes out through the openings 80, pressure is built up in the chamber 23, and the air is therefore maintained at the same temperature and humidity throughout. It then passes horizontally out through the space between the egg trays in the racks 20.

The air circulation pattern is thus horizontal between chambers and vertical in the chambers. There is no hot blast from the ceiling into the service chamber (as in prior art incubators) and the air issuing from the front of the racks 20 is not objectionable to workers because it is spread out over a wide area. The service chamber 22 is thus kept comfortable for working. When the chicks have hatched the racks may be cleaned inside the room 16 at the sink 50 and the incubator interior washed out by a hose fastened to the faucet 51.

Moreover, the air flow into the service chamber 22 through the manifold 72 and through the racks 20 is exactly balanced to the air going out of the service chamber 22 through the units 30. Therefore, when the door 17 is opened, there is no rush of air in either direction, and the circulation pattern remains substantially unchanged.

The incubator of this invention possesses many advantages over the previous incubators. In it the temperature and humidity may be maintained at a uniform level with a variation of less than one percent. Air is circulated constantly over the eggs, withdrawing excessive animal heat or, when necessary, keeping the eggs warm. The maintenance of a uniform temperature and humidity insures that the hatched chicks will be healthy and normal.

Since the motors 55 and 76 are placed in the attic 15 where they are protected from the moist air inside the room 16 the danger of unexpected stoppages is greatly reduced, and repairs and replacement are less frequent. Even should a stoppage occur, as for example in case the power supply were cut off, the large air space inside the incubator provides an extra margin of safety since the egg racks 20 take up only about one-third of the space inside the room 16. Whereas a stoppage of twenty minutes is fatal with the usual incubator, the present incubator affords protection for the eggs for several hours. At the same time, the improved warning system gives warning when the conditions vary only slightly from the ideal.

It is obvious that the trays may be removed individually without at all affecting the other trays in the rack. Even when the door 17 is opened and closed, or left open for a substantial period, there is no perceptible change in the ventilating system because of its perfect balance. Thus the operator is free to enter the incubator at any time in comparative comfort and in perfect safety. With this incubator, he is free at any time to inspect the chicks, remove those that have hatched, and leave the unhatched eggs, without danger or discomfort to either himself or the chicks.

The novel humidifying and down eliminator further protect the health of the operator and of the chicks. With this incubator the mortality of chicks is decreased to an almost negligible percentage, and those which are hatched are almost uniformly normal and healthy.

I claim:

1. A walk-in incubator comprising an insulated building; a ceiling in said building dividing it into a machinery-housing attic and an incubation room; at least one row of tray-supporting racks, spaced from the walls in said room, from each other, and from said ceiling so that the racks occupy less than one-third of the volume of said incubating room; vertical partitions cooperating with said racks, said ceiling, and the walls of said room to divide said room into a service chamber on the front side of each rack and a pressure chamber on the back side of each rack; a door through the walls of said room opening into said service chamber; and means supported in said partitions for forcing air from said service chamber into said pressure chamber, the pressure in said pressure chamber subsequently causing the air to flow back into said service chamber horizontally through said racks, said air-forcing means comprising an apparatus for circulating down-free air while regulating its humidity, and including a housing supported in said partition above said racks, a fan adjacent the service chamber end of said housing and adapted to force air through said housing, means in said housing adapted to send a subdivided flow of water in the path of the air passing therethrough, means to vary the temperature of said water, and a drain opening in said housing for moving excess water therefrom.

2. The incubator claimed in claim 1 in which said temperature varying means comprises a hot water pipe, a cold water pipe, a combination pipe passing to said spray, and valves to regulate the proportion of water entering from said cold and hot water pipes into said combination pipe, while maintaining a constant total flow.

3. The incubator claimed in claim 1 in which there is a heating device between said fan and said humidifying means, a dry bulb thermometer on the air-receiving side of said apparatus, and means responsive to changes in temperature registered by said thermometer for turning said heating device on or off.

4. A walk-in incubator comprising a walled and ceilinged room; at least one row of tray-supporting racks, spaced from the walls in said room, from each other, and from the ceiling so that the racks occupy less than one-third of the volume of said room; vertical partitions cooperating with said racks, said ceiling, and the walls of said room to divide said room into a service chamber on the front side of each rack and a pressure chamber on the back side of each rack; a door through the walls of said room opening into said service chamber; a housing supported in said partition above said racks; a fan adjacent the service chamber end of said housing for forcing air through said housing from said service chamber into said pressure chamber, the pressure in said pressure chamber subsequently causing the air to flow back into said service chamber horizontally through said racks; means in said housing for sending a subdivided flow of water into the path of the air passing through said housing; means for varying the temperature of said water; and a drain opening in said housing for removing excess water therefrom.

5. A walk-in incubator comprising a walled and ceilinged room; at least one row of tray-supporting racks, spaced from the walls and ceiling in said room; vertical partitions cooperating with said racks, said ceiling, and the walls of said room to divide said room into a service chamber on the front side of each rack and a pressure chamber on the back side of each rack; a housing supported in said partition above said racks; a fan adjacent the service chamber end of said housing for forcing air through said housing from said service chamber into said pressure chamber, the pressure in said pressure chamber subsequently causing the air to flow back into said service chamber horizontally through said racks; means in said housing for sending a subdivided flow of water into the path of the air passing through said housing; means for varying the temperature of said water; and a drain opening in said housing for removing excess water therefrom.

HORACE W. DRYDEN.

References Cited in the file of this patent

UNITED STATES PATENTS

| Number | Name | Date |
|---|---|---|
| 558,765 | Blanco | Apr. 21, 1896 |
| 854,270 | Carrier | May 21, 1907 |
| 902,713 | Carrier | Nov. 3, 1908 |
| 1,121,722 | Fessenden | Dec. 22, 1914 |
| 1,393,086 | Carrier | Oct. 11, 1921 |
| 1,458,985 | Lewis | June 19, 1923 |
| 1,782,609 | Gaskill | Nov. 25, 1930 |
| 1,795,418 | Bailey | Mar. 10, 1931 |
| 1,911,249 | Stover | May 30, 1933 |
| 1,911,250 | Stover | May 30, 1933 |
| 1,918,939 | Sturgis | July 18, 1933 |
| 1,926,464 | Stover | Sept. 12, 1933 |
| 2,060,411 | Brace | Nov. 10, 1936 |
| 2,137,996 | Crawford | Nov. 22, 1938 |
| 2,163,363 | Markey | June 20, 1939 |
| 2,184,685 | Brace | Dec. 26, 1939 |

FOREIGN PATENTS

| Number | Country | Date |
|---|---|---|
| 393,309 | Great Britain | May 30, 1933 |
| 417,587 | Great Britain | Oct. 9, 1934 |